(12) United States Patent
Arch (10) Patent No.: US 10,343,041 B2
(45) Date of Patent: Jul. 9, 2019

(54) APPARATUS AND METHOD FOR MEASURING AND ADJUSTING A GOLF CLUB LOFT AND LIE

(71) Applicant: Acushnet Company, Fairhaven, MA (US)

(72) Inventor: Chad Arch, Oceanside, CA (US)

(73) Assignee: Acushnet Company, Fairhaven, MA (US)

( * ) Notice: Subject to any disclaimer, the term of this patent is extended or adjusted under 35 U.S.C. 154(b) by 129 days.

(21) Appl. No.: 15/633,304

(22) Filed: Jun. 26, 2017

(65) Prior Publication Data

US 2018/0369670 A1 Dec. 27, 2018

(51) Int. Cl.
| | |
|---|---|
| *A63B 60/42* | (2015.01) |
| *G06T 7/90* | (2017.01) |
| *G01B 11/26* | (2006.01) |
| *G01D 5/02* | (2006.01) |
| *G01B 5/00* | (2006.01) |
| *A63B 53/02* | (2015.01) |
| *H04N 5/225* | (2006.01) |

(52) U.S. Cl.
CPC ............ *A63B 60/42* (2015.10); *G01B 5/0023* (2013.01); *G01B 11/26* (2013.01); *G01D 5/02* (2013.01); *G06T 7/90* (2017.01); *A63B 2053/022* (2013.01); *G06T 2207/10024* (2013.01); *G06T 2207/30221* (2013.01); *H04N 5/2252* (2013.01)

(58) Field of Classification Search
None
See application file for complete search history.

(56) References Cited

U.S. PATENT DOCUMENTS

| | | | |
|---|---|---|---|
| 4,094,072 A | 6/1978 | Erb | |
| 4,622,836 A | 11/1986 | Long | |
| 4,875,293 A | 10/1989 | Wakefield | |
| 5,105,550 A | 4/1992 | Shenoha | |
| 5,421,098 A | 6/1995 | Muldoon | |
| 5,884,409 A | 3/1999 | Muldoon | |
| 6,363,620 B1 | 4/2002 | Goodjohn | |
| 6,508,007 B1 | 1/2003 | Muldoon | |
| 6,644,102 B2 | 11/2003 | Cameron | |
| 6,871,414 B2 | 3/2005 | Burney | |
| 7,010,965 B2 | 3/2006 | Cameron | |
| 7,164,473 B2 * | 1/2007 | Goodjohn | G01B 5/0023 356/139.04 |
| 7,263,866 B2 * | 9/2007 | Latiri | G01B 5/0023 72/31.02 |
| 7,403,277 B2 | 7/2008 | Goodjohn | |
| 7,513,060 B2 * | 4/2009 | Souza | A63B 60/42 33/508 |

(Continued)

*Primary Examiner* — Peter J Macchiarolo
*Assistant Examiner* — Jermaine L Jenkins
(74) *Attorney, Agent, or Firm* — Randy K. Chang (57) ABSTRACT

An apparatus for measuring loft and lie of a golf club head with better accuracy is disclosed herein. More specifically, the present invention discloses an apparatus that utilizes a high precision camera that focuses on the striking face portion of the golf club head, working in conjunctions with encoders near the shaft portion of a golf club head, to instantaneously provide precision measurement of the loft and lie of the golf club head and feedback to the operator in order to allow for more precision adjustment to the loft and lie of the golf club head.

16 Claims, 11 Drawing Sheets

(56) References Cited

U.S. PATENT DOCUMENTS

| | | | |
|---|---|---|---|
| 7,758,440 B2 * | 7/2010 | Llewellyn | A63B 53/0466 |
| | | | 473/244 |
| 7,984,559 B2 * | 7/2011 | Burns | G01B 5/0023 |
| | | | 33/508 |
| 8,574,091 B2 | 11/2013 | Cameron | |
| 9,163,919 B2 | 10/2015 | Holtzman | |
| 9,566,627 B2 * | 2/2017 | Timmons | B21D 3/16 |
| 10,052,530 B2 * | 8/2018 | Greaney | A63B 53/0466 |
| 2003/0008731 A1 * | 1/2003 | Anderson | A63B 24/0003 |
| | | | 473/407 |

* cited by examiner

APPARATUS AND METHOD FOR MEASURING AND ADJUSTING A GOLF CLUB LOFT AND LIE

FIELD OF THE INVENTION

The present invention relates generally to an apparatus that is capable of measuring the loft and lie angle of a golf club with improved precision and accuracy. The present invention utilizes a high precision camera that focuses on the striking face portion of the golf club head, working in conjunctions with encoders near the shaft portion of a golf club head; to instantaneously provide precision measurement of the loft and lie of the golf club head and feedback to the operator in order to allow for more precision adjustment to the loft and lie of the golf club head.

BACKGROUND OF THE INVENTION

The game of golf is a precision sport. Often, minor mistakes in a golf swing can result in a catastrophic result that significantly deviates from the intended result. For example, a small and minor 5 degree deviation from the intended target in a swing path could easily result in a golf shot that is often offline by 26 yards or more on a standard 300 yard drive. Hence, as it can be seen from the example above, precision is of the utmost importance in the game of golf.

In a game that requires such a high degree of precision, the equipment used to help a golfer execute that golf shot needs to be held at an even higher standard, allowing the golfer to execute his or her shot without having to worry about deviations in the equipment. In addition to creating equipment with exacting specifications, that same amount of specificity and precision is required when golfers want to modify their golf clubs to fit the specific needs of their swing.

U.S. Pat. No. 5,105,550 to Shenoha illustrates one of the earlier attempts to provide measurements of golf club loft and lie in order to determine the loft and lie of the golf club itself. Although U.S. Pat. No. 5,105,550 to Shenoha does not provide a basis for adjusting the loft and lie of the golf club head, it provides an early method of accurately determining the loft and lie, allowing an operator to make changes to the loft and lie of a golf club head and re-verifying the changes.

U.S. Pat. No. 5,884,409 to Muldoon illustrates another invention, wherein the loft and lie of the golf club head can be measured and adjusted. U.S. Pat. No. 5,884,409 to Mouldoon utilizes a clamping mechanism adapted to clamp the face of the golf club head at a predetermined angle with respect to the base, but requires the operator to set up the golf club correctly in the apparatus, which can lead to error and inconsistency.

The inconsistencies in the measurement that require operator input has led to modern day inventions that try to eliminate that potential for error using cameras. U.S. Pat. No. 6,871,414 to Burney et al. focuses on using two cameras being spaced apart from the clamping assembly to provide a stereoscopic view of the shaft of the golf club. This method greatly improves upon the original method in terms of efficiency of measurement, but still requires an operator to install a club correctly into the clamping assembly to yield accurate results.

Despite all the advancement in the technology, the industry still relies on an operator to set up the golf club in the clamping apparatus correctly. In addition to the above, all the existing technology has no way of ensuring that the golf club did not move during the adjustment process. Hence it can be seen that there is a need in the industry for a precise method to measure and adjust the loft and lie of a golf club.

BRIEF SUMMARY OF THE INVENTION

One aspect of the present invention is an apparatus for measuring and adjusting loft and lie angles of a golf club comprising of a clamping assembly, adapted to clamp a head portion of said golf club and wherein said clamping assembly further comprises a camera. The camera is fixedly located at a frontal portion of said clamping assembly and adapted to be focused on a plurality of scorelines located on a club head portion of the golf club. The apparatus further comprises a shaft measurement assembly, adapted to engage a shaft portion of said golf club head, wherein the shaft measurement assembly further comprises two or more encoders and the two or more encoders are adapted to measure a preliminary loft angle and a preliminary lie angle of the golf club, wherein the apparatus utilizes an orientation of the plurality of scorelines to determine a true loft angle and a true lie angle of the golf club.

In another aspect of the present invention is an apparatus for measuring and adjusting loft and lie angles of a golf club comprising of a clamping assembly, adapted to clamp a head portion of said golf club and wherein said clamping assembly further comprises a camera. The camera is fixedly located at a frontal portion of said clamping assembly and adapted to be focused on a plurality of scorelines located on a club head portion of the golf club. The apparatus further comprises a shaft measurement assembly, adapted to engage a shaft portion of said golf club head, wherein the shaft measurement assembly further comprises two or more encoders and the two or more encoders are adapted to measure a preliminary loft angle and a preliminary lie angle of the golf club, wherein the apparatus determines a true loft angle and a true lie angle of the golf club by adjusting the preliminary loft angle and the preliminary lie angle using the orientation of the plurality of scorelines.

In another aspect of the present invention is a method of measuring and adjusting the loft and lie angle of a golf club head comprising of the steps of inserting a golf club head into an apparatus, aligning a shaft portion of the golf club head with at least one shaft alignment feature portion on the apparatus, and measuring a loft angle and a lie angle of the golf club, wherein the step of measuring said loft angle and said lie angle of said golf club utilizes a camera and a plurality of two or more encoders, and the camera adjusts a preliminary loft angle and a preliminary lie angle measurement of the plurality of two or more encoders to yield a true loft angle and a true lie angle.

These and other features, aspects and advantages of the present invention will become better understood with reference to the following drawings, description and claims.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

DETAILED DESCRIPTION OF THE INVENTION

The following detailed description describes the best currently contemplated modes of carrying out the invention. The description is not to be taken in a limiting sense, but is made merely for the purpose of illustrating the general principles of the invention, since the scope of the invention is best defined by the appended claims.

Various inventive features are described below and each can be used independently of one another or in combination with other features. However, any single inventive feature may not address any or all of the problems discussed above or may only address one of the problems discussed above. Further, one or more of the problems discussed above may not be fully addressed by any of the features described below.

Figure 1:
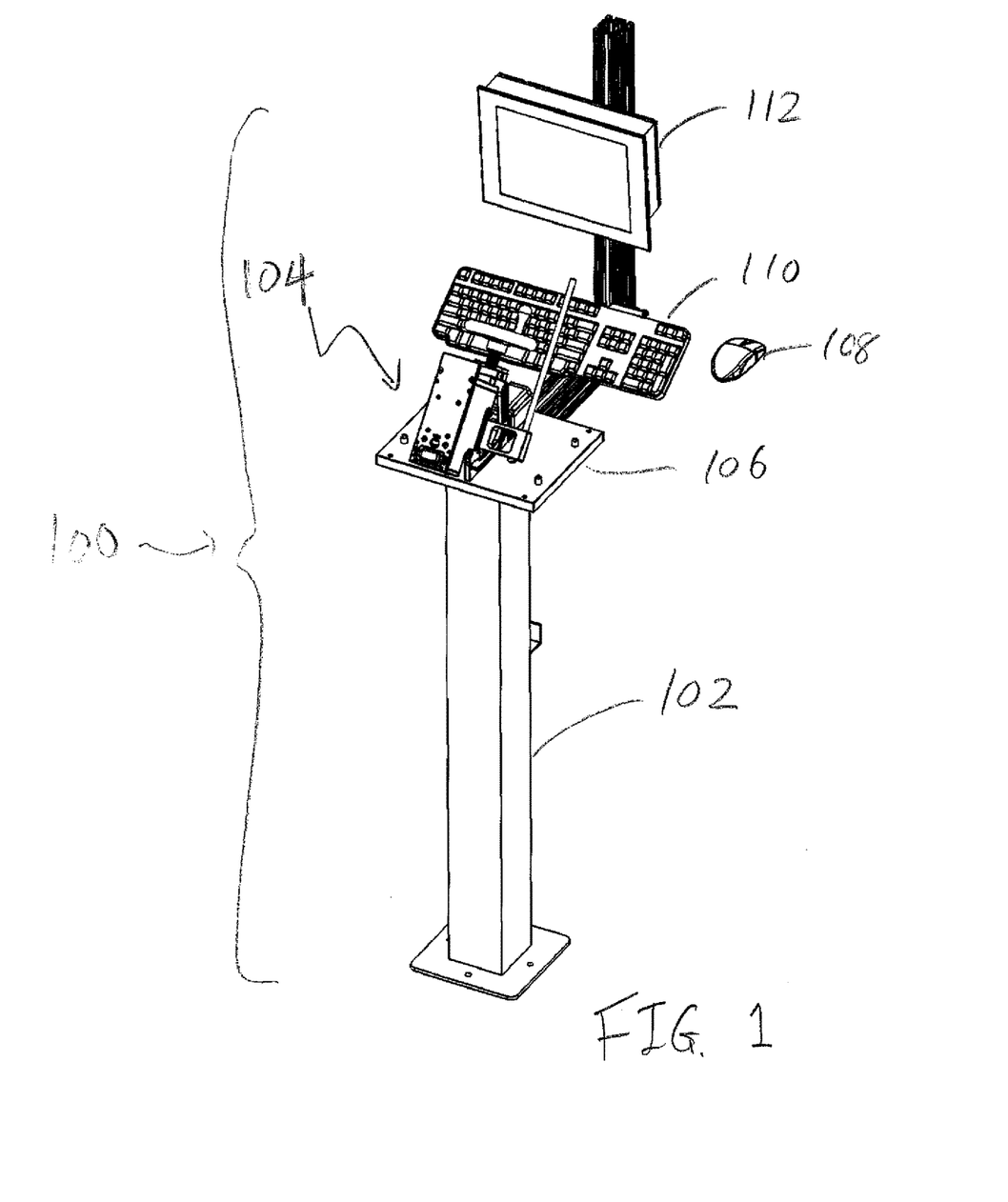
FIG. 1 of the accompanying drawings shows a perspective view of an apparatus for measuring and adjusting the loft and lie angle of a golf club in accordance with an exemplary embodiment of the present invention.

FIG. 1 of the accompanying drawing shows a perspective view of an assembly 100 comprising of an apparatus 104 for measuring and adjusting the loft and lie angle of a golf club. The assembly 100 further comprises a base 102, a mounting plate 106, a mouse 108, a keyboard 110, and a monitor 112. The base 102 elevates the apparatus 104 up from a ground level to allow the operator to be able to work on the adjustment of the golf club. The mounting plate 106 provides a flat and level working surface from which the apparatus 104 for measuring and adjusting the loft and lie angle of a golf club can be attached. The mouse 108, keyboard 110, and the monitor 112 work in conjunction with one another to display information relating to the basic characteristics of the golf club, including the loft angle and the lie angle. In an alternative embodiment of the present invention, the monitor 112 could be a touch screen type display that incorporates the processor behind the display, thus eliminating the need of the mouse 108 and the keyboard 110 without departing from the scope and content of the present invention. The mouse 108 and keyboard 110 may generally be considered input devices, while the monitor 112 may be considered a type of display; however in the alternative embodiment of the present invention the monitor 112 is a touchscreen, the monitor 112 may also incorporate the input devices without departing from the scope and content of the present invention.

Figure 2:
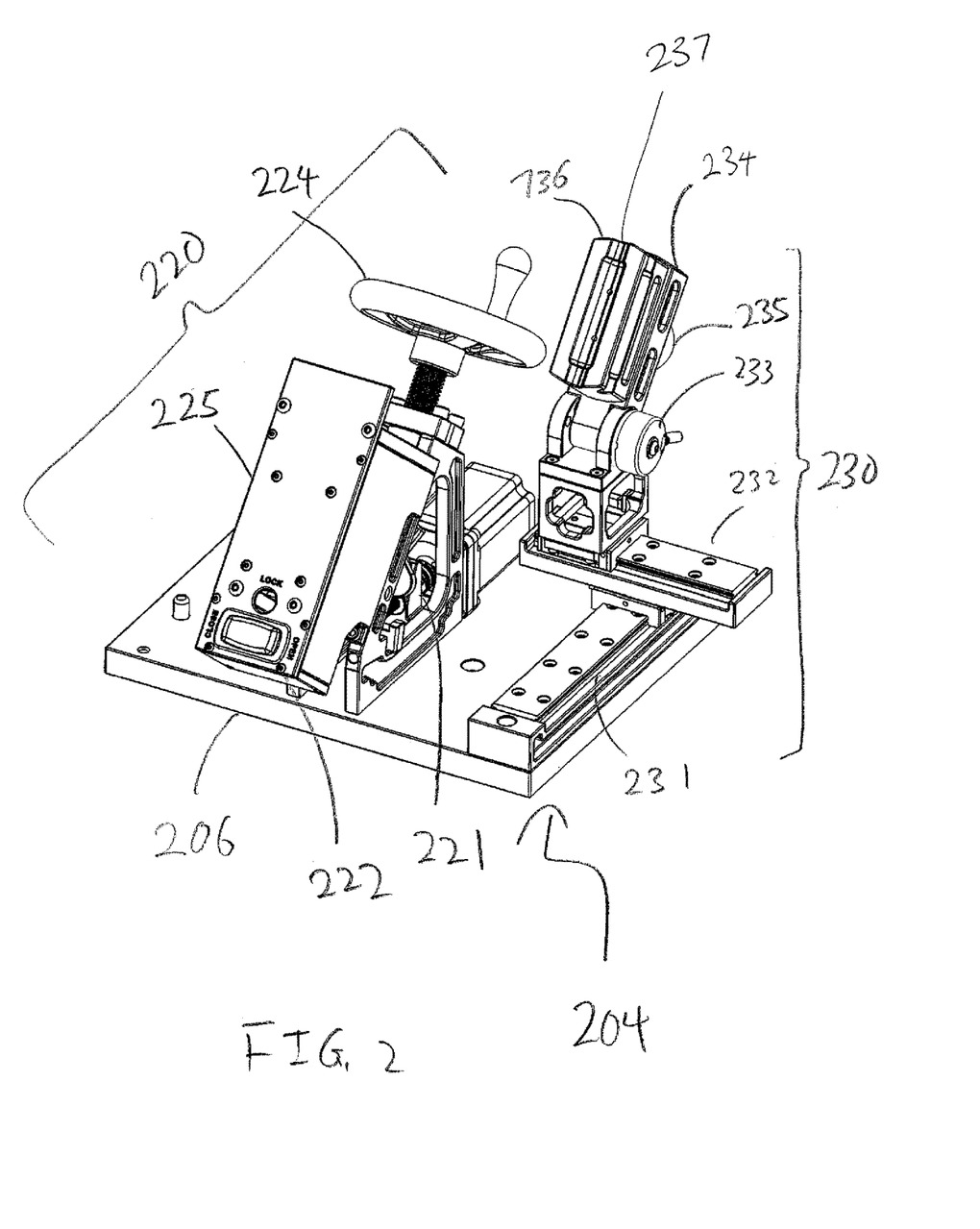
FIG. 2 of the accompanying drawings shows an enlarged perspective view of a clamping assembly and a shaft measurement assembly, both of which are important components of an apparatus for measuring and adjusting the loft and lie angle of a golf club head in accordance with an exemplary embodiment of the present invention.

FIG. 2 of the accompanying drawings shows an enlarged perspective view of the apparatus 204 for measuring and adjusting the loft and lie of the golf club head. The enlarged view of the apparatus 204 allows for the various component associated with the apparatus 204 to be shown more clearly. The apparatus 204 here may generally be comprised of several key components beginning with the base mounting plate 206, which provides a base from which the additional components are attached. Attached to the base plate is a clamping assembly 220 located on a left side of the base mounting plate 206. The clamping assembly 220 may further comprise additional sub-components such as a rear clamp 221, a rear clamp motor switch 222, a top clamp (shown in FIG. 4 as 423), a top clamp handle 224, and a camera housing 225. The camera housing 225 may generally include an actual camera (shown in FIG. 5) inside the camera housing 225, wherein the camera can be used to provide an accurate determination of the loft and lie of a golf club head. On the right hand side of the base mounting plate 206 is the shaft measurement assembly 230, which works in conjunction with the clamping assembly 220 to complete the apparatus 204. In an alternative embodiment of the present invention, the shaft measurement assembly 230 may be on the left hand side of the base mounting plate 206 in order to accommodate a left handed golf club. In essence, the placement of the clamping assembly 220 is actually placed at a centralized location on the mounting plate 206, while the placement of the shaft measurement assembly 230 may be placed either to the left of it or to the right of it, all without departing from the scope and content of the present invention.

The shaft measurement assembly 230 in this embodiment of the present invention may further comprise additional sub-components such as a y-axis linear bearing 231, a x-axis linear bearing 232, a loft encode 233 attached to a loft measurement fixture 234, and a lie encoder 235 attached to a lie measurement fixture 236. In this exemplary embodiment of the present invention, the y-axis linear bearing 232 is attached to the base mounting plate 206, allowing the entirety of the share measurement assembly 230 to be shifted along a y-axis. The x-axis linear bearing 232 in this embodiment of the present invention may generally be attached to the y-axis linear bearing 232, allowing the entirety of the shaft measurement assembly 230 to be shifted along the x-axis. Although this embodiment of the present invention utilizes x and y axis bearings 231 and 232 respectively to help the shaft measurement assembly 230, various other movement methods may be used without departing from the scope and content of the present invention, so long as it is capable of movement of the assembly in 2 or more axes.

Attached to the x-axis linear bearing 232 is loft encoder 233, which is fixedly attached to a loft measurement fixture 234. The loft measurement fixture 234 in this invention is coupled to the loft encoder 233, allowing the loft of the golf club head to be determined based on the position of the loft measurement fixture 234 and the loft encoder 233. The loft encoder 233 converts the angular position of the loft measurement fixture 234 into an analog or digital output, allowing the result to be displayed on the monitor 112 (shown in FIG. 1). The lie encoder 235 in the present invention is fixedly attached to the lie measurement fixture 236, and allowed to rotate on top of the loft measurement fixture 234. The lie encoder 235, similar to the loft encoder 233, converts the angular position of the lie measurement fixture 236 into an analog or digital output, allowing the result to be displayed on the monitor 112 (shown in FIG. 1). The loft measurement fixture 234 and the lie measurement fixture 236 work together via a shaft alignment feature 237 to engage the shaft of a golf club, which is considered an extension of the golf club head itself.

Figure 3:
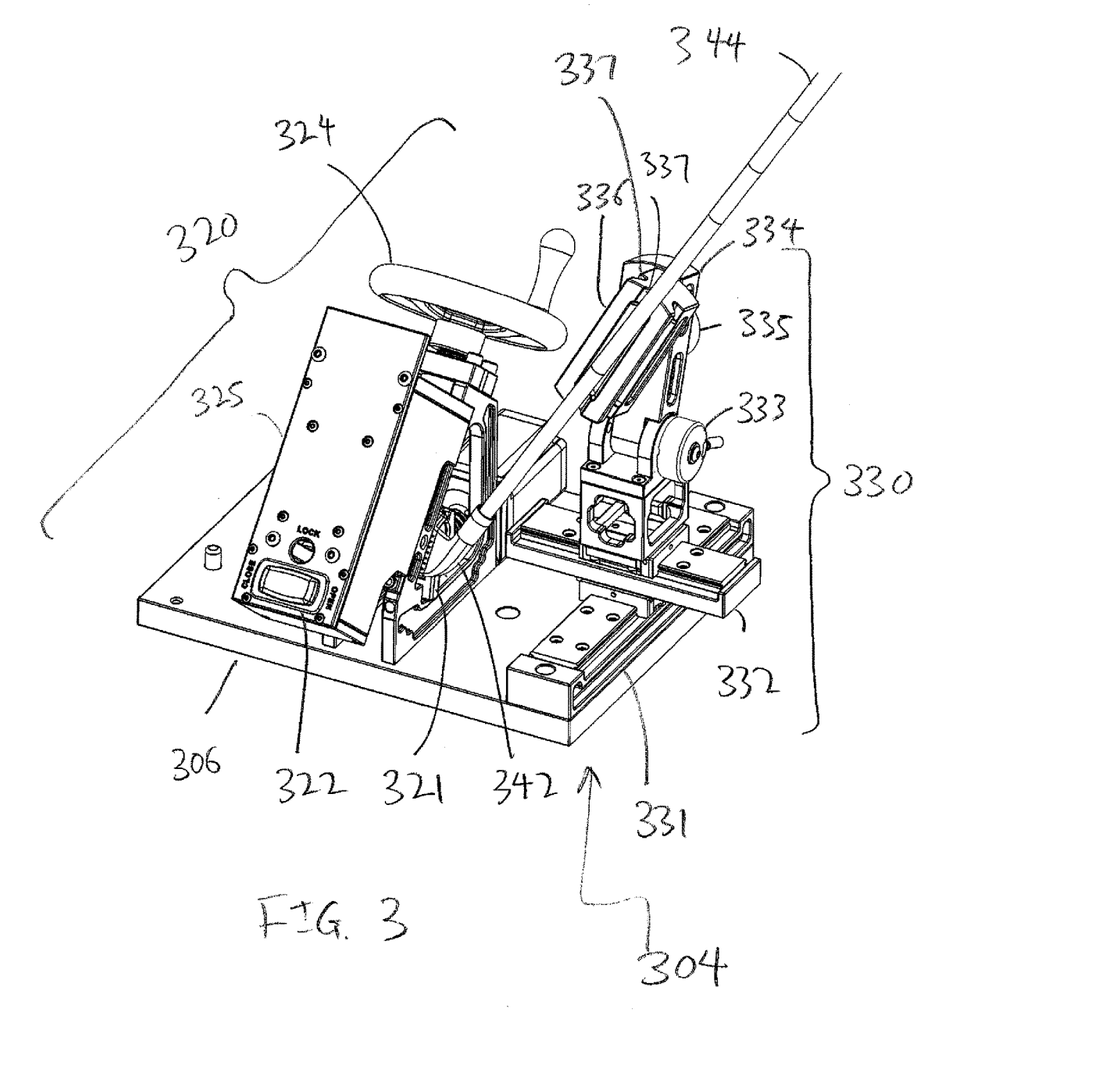
FIG. 3 of the accompanying drawings shows a frontal perspective view with a golf club installed in the apparatus for measuring and adjusting the loft and lie angle of a golf club head in accordance with an exemplary embodiment of the present invention.

In order to better understand how the current apparatus 204 interfaces with an actual golf club, FIG. 3 of the accompanying drawing is provided herein with a golf club 340 having a club head 342 and a shaft 344 installed in the apparatus 304. FIG. 3 of the accompanying drawing shows a perspective close up view of the current inventive apparatus 304 for adjusting loft and lie angle with a golf club 340 installed. The golf club 340 has a club head 342 component and a shaft 344 component. In this illustrative figure, the club head 342 is secured by the clamping assembly 320, utilizing a back clamp 321 and a top clamp (shown in FIG. 4 as 423). In this embodiment, the back clamp 321 is controlled by a electrical motor, while the top clamp (shown in FIG. 4 as 423) is controlled by the top clamp handle 324; however, either clamp could be controlled by any other alternative methods of securement without departing from the scope and content of the present invention. Once the club head 342 is secured, then the loft and lie angle of the golf club itself may be determined based on the loft measurement fixture 334 and the lie measurement fixture 336 and their encoders 333 and 335 respectively. The loft and lie of the golf club head 342 is generally measured by aligning the shaft 344 with at least one shaft alignment feature 337 located on the lie measurement fixture 336. The shaft alignment feature 337 in accordance with this embodiment of the present invention may defined as at least one grooves that engage the perimeter of the shaft. If the shaft of the golf club is completely cylindrical, then only one groove is necessary to determine the loft and lie angle of the golf club, as a complete and complimentary mate between the shaft and one of the shaft groove would yield accurate readings of the loft and lie. However, in most realistic situations, golf club shafts are tapered, thus two or more grooves are needed to isolate correct loft reading and the correct lie reading independently. In order to address this, the at least one shaft alignment feature 337 may have grooves at different planes to help isolate the loft and lie measurements independently. By making sure that the shaft 344 is aligned with the two or more grooves of the at least one shaft alignment feature 337, both the loft and lie of the golf club head 342 can be determined using the encoders 333 and 335 respectively.

Figure 4:
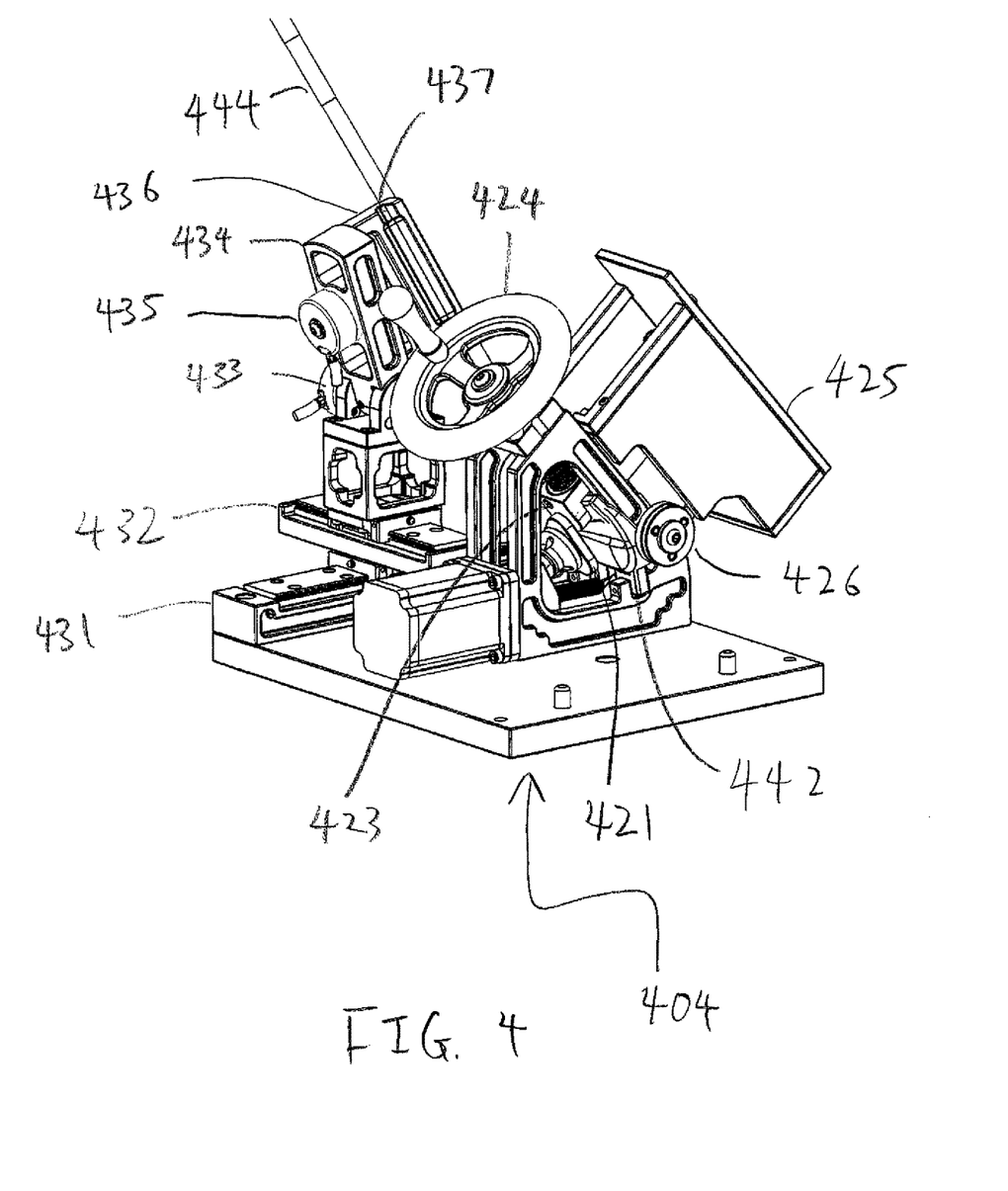
FIG. 4 of the accompanying drawings shows a rear perspective view with a golf club installed in the apparatus for measuring and adjusting the loft and lie angle of a golf club head in accordance with an exemplary embodiment of the present invention.

FIG. 4 of the accompanying drawings provides a reverse perspective view of the apparatus 404 in accordance with the present invention, allowing some of the previously described and less visually discernable components to be shown more clearly. First and foremost, FIG. 4, by providing a different perspective view, allows the top clamp 423 to be shown clearly. The top clamp 423, travels up and down and is capable of securing the golf club head 342 to the apparatus 404 using the top clamp handle 424. In addition to securing the golf club head 442 in a top and bottom direction, FIG. 4 also shows the rear clamp 421 more clearly as well. The rear clamp 421, may travel in a forward and back direction securing the club head 442 in a front to back direction via a electrical motor controlled by a back clamp motor switch (shown in FIG. 3 as 322). Finally, FIG. 4 of the accompanying drawings shows an additional component called a toe stop 426 not previously shown. The toe stop 426 is used to provide a way to ensure that the golf club head 442 does not get inserted too far into the apparatus 404.

Without going into details regarding the most important component of the apparatus 404, the camera (shown later in FIG. 5) located inside the camera housing 425, one can easily identify that the above described process misses out on a key component to achieving accuracy in the measurement. More specifically, as it can be seen from the drawings and description above, the above methodology lacks a way to ensure that the golf club head 442 is correctly secured in the apparatus 404 and that the clamps 421 and 423 do not change the placement of the golf club head 442 in the clamping apparatus 404. Currently in the art, the operator is in charge of accurately placing the golf club head 442 in the apparatus 404 using the clamps 421 by visually inspecting the orientation of the scorelines are completely horizontal relative to the ground plane. The present invention improves upon this by removing any errors that can be associated with the operator via a camera that constantly adjusts the results to compensate for any deviation of the club head orientation by focusing the camera on the scorelines.

Figure 5:
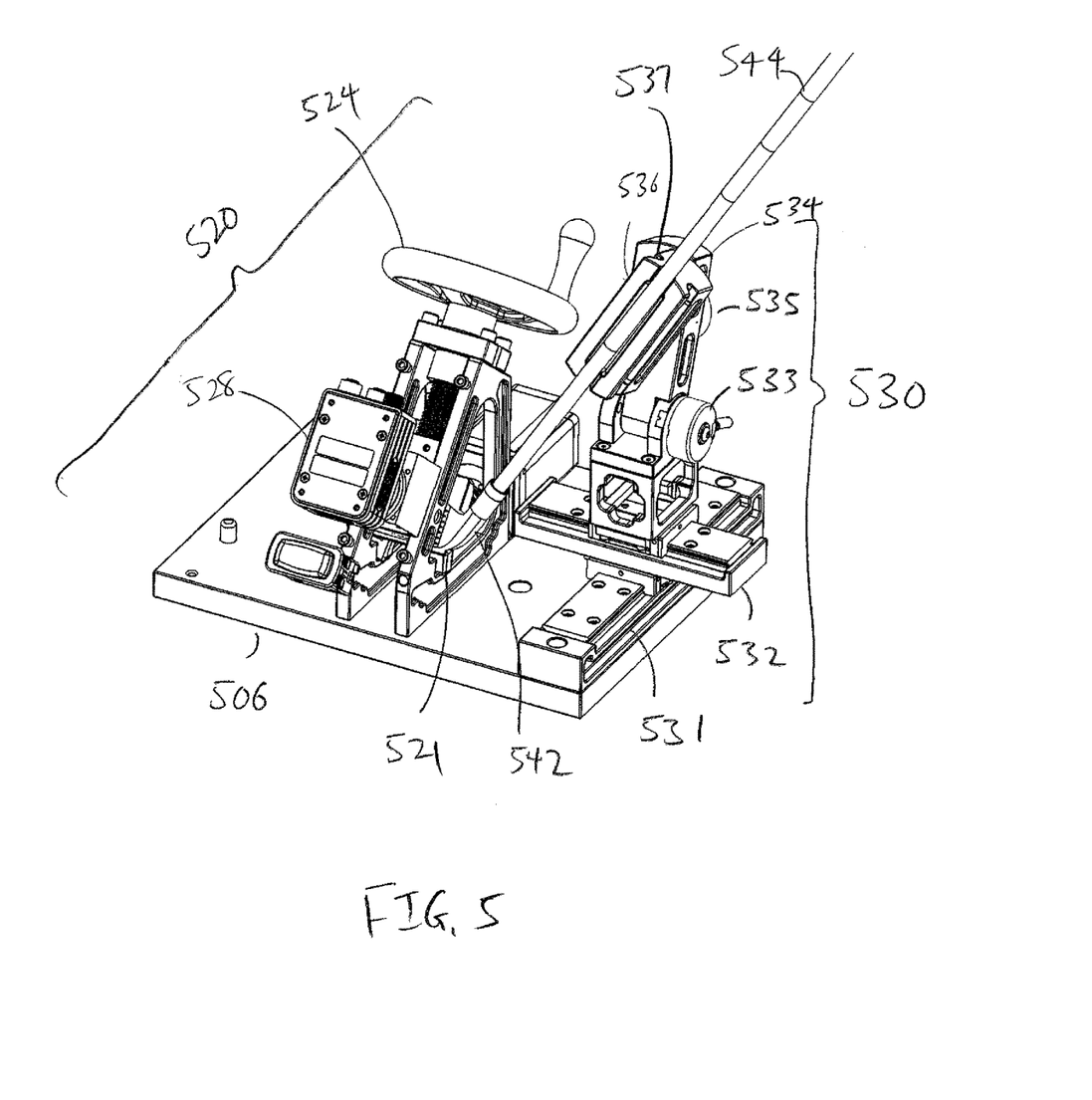
FIG. 5 of the accompanying drawings shows a frontal perspective view with a golf club installed in the apparatus for measuring and adjusting the loft and lie angle of a golf club head in accordance with an exemplary embodiment of the present invention with the camera housing removed, allowing the camera to be shown more clearly.

In order to address this issue, it is critical for the invention to be further comprised of a camera 528 inside the camera housing 425 (shown in FIG. 4). In order to illustrate this camera 528, FIG. 5 is provided illustrating a perspective view of the apparatus 504 for measuring loft and lie angle of a golf club head having the camera housing 425 (shown in FIG. 4) completely removed for illustration purposes. Based on the illustration shown in FIG. 5, it can be seen that the camera 528 is placed directly above the striking face of the golf club head 542. By mounting the camera 528 so close to and focusing on the striking face of the golf club head 542 allows the camera to focus on the scorelines on the golf club head 542.

The present invention utilizes the scorelines of the golf club head 542 to provide instantaneous feedback as to the position of the golf club head 542 itself to help ensure that the measurements of the loft and lie encoders 533 and 535 respectively are providing accurate readings as to the true loft and lie of the golf club head 542 itself. This instantaneous feedback of the position of the golf club head 542 is achieved by correlating the position of the scorelines on the golf club head 542 with a known reference value established by a calibration plate. Once the relationship between the scorelines of the calibration plate and the loft and lie encoders 533 and 535 respectively is established, the entire apparatus is considered to be calibrated. In order to illustrate the methodology of calibrating and measuring as well as providing instantaneous feedback, FIG. 6 of the accompanying drawings provides a simple flow chart.

Figure 6:
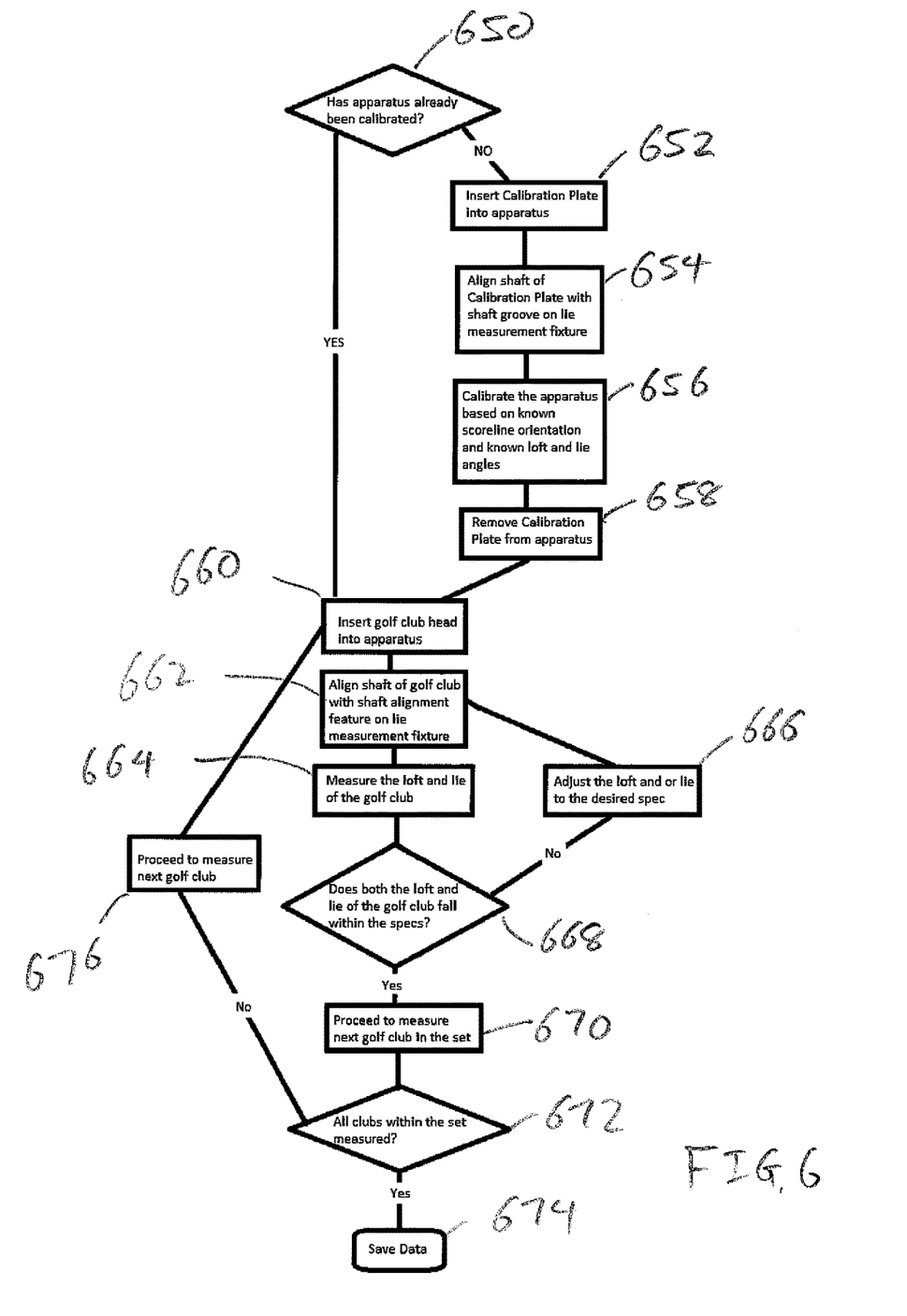
FIG. 6 of the accompanying drawings shows a flow chart diagram of a method to measure and adjust the loft and lie angle of a golf club head in accordance with an exemplary embodiment of the present invention.

FIG. 6 of the accompanying drawings provides a simple flow chart illustrating a method to calibrate, measure, and adjust the loft and lie angle of a golf club. The flow chart begins in step 650 wherein the initial step determines whether the apparatus has been properly calibrated. If the apparatus has been properly calibrated, then the flow chart moves to step 660, wherein a golf club head can be inserted into the apparatus. However, in the event that the apparatus has not been calibrated, then the current method begins as step 652 wherein a calibration plate is inserted into the apparatus. The calibration plate has a known loft and lie angle relative to a known scoreline pattern. These known criteria allow the apparatus to establish a baseline for the relationship between the measurements. Once the calibration plate is inserted into the apparatus in step 652, step 654 aligns the shaft of the calibration plate with the shaft alignment feature on the lie measurement fixture. The shaft alignment feature, although only placed on the lie measurement fixture, is capable of determining the loft and lie of the shaft of the golf club, as the left to right alignment work in conjunction with a top to bottom alignment to determine both the loft and lie respectively. Once the shaft of the calibration plate is aligned with the shaft alignment feature in step 654, the apparatus is calibrated in step 656, based on the known scoreline orientation and known loft and lie angles. Details regarding the method of calibration will be discussed in subsequent figures, as it requires a more detailed illustration of the calibration plate and its corresponding scorelines. Once step 656 is completed, step 658 removes the calibration plate from the apparatus.

Returning to our discussion of step 660, which begin the actual measurement and adjustment of a loft and lie of a golf club head, it can be seen that step 660 begins this process by inserting a golf club head into the apparatus. Once the golf club head is inserted into the apparatus, the shaft of the golf club head is aligned with the shaft alignment feature on the lie measurement fixture in step 662. Once the shaft of the golf club is aligned with the lie measurement fixture in step 662, a measurement of the loft and lie can be determined in step 664 based on the encoders that are attached to the loft and lie measurement fixture, relative to the scorelines on the striking face that are identified by the camera. Once again, more details regarding the determination of the loft and lie relative to the scorelines are explained in more detail in subsequent figures. Although step 664 may seem simple on its surface, the complexities of this step are immense, and deserve more discussion here.

Here in step 664, the encoders previously shown are first used to measure a preliminary loft angle and a preliminary lie angle. These angles are the actual measurements obtained by the encoder in step 662. However, the method used to obtain actual accurate measurements does not end there. In order to truly obtain accurate measurements, any variation of the golf club orientation from the "true square" orientation of the golf club must be accounted for. The present invention does this by focusing the camera on the scorelines to create a baseline orientation in order to compare it to a "true square" orientation. How the camera obtains the baseline orientation is a complicated method involving focusing the camera on the change in shading created by on-axis light at the boundaries of the scorelines that will be discussed in more detail later. Once the variation is determined, the preliminary loft angle may be adjusted to yield a true loft angle and the preliminary lie angle may be adjusted to yield a true lie angle.

Once the measurement is taken in step 664, a determination needs to be done at step 668 to decide if the existing loft and lie is consistent with the desired result, if not, then step 666 is needed to adjust the loft and lie of the golf club and measurements are taken again in step 662. However, if the measured result is obtained, then step 670 immediately follows in proceeding to the measure the next club in the set. At step 672, a determination is required to determine if any additional clubs needs to be measured. If the answer is yes, then the entire method returns to step 660 by inserting a new club into the apparatus. However, is no other club needs to be measured, and then the data can be saved in step 674.

Figure 7:
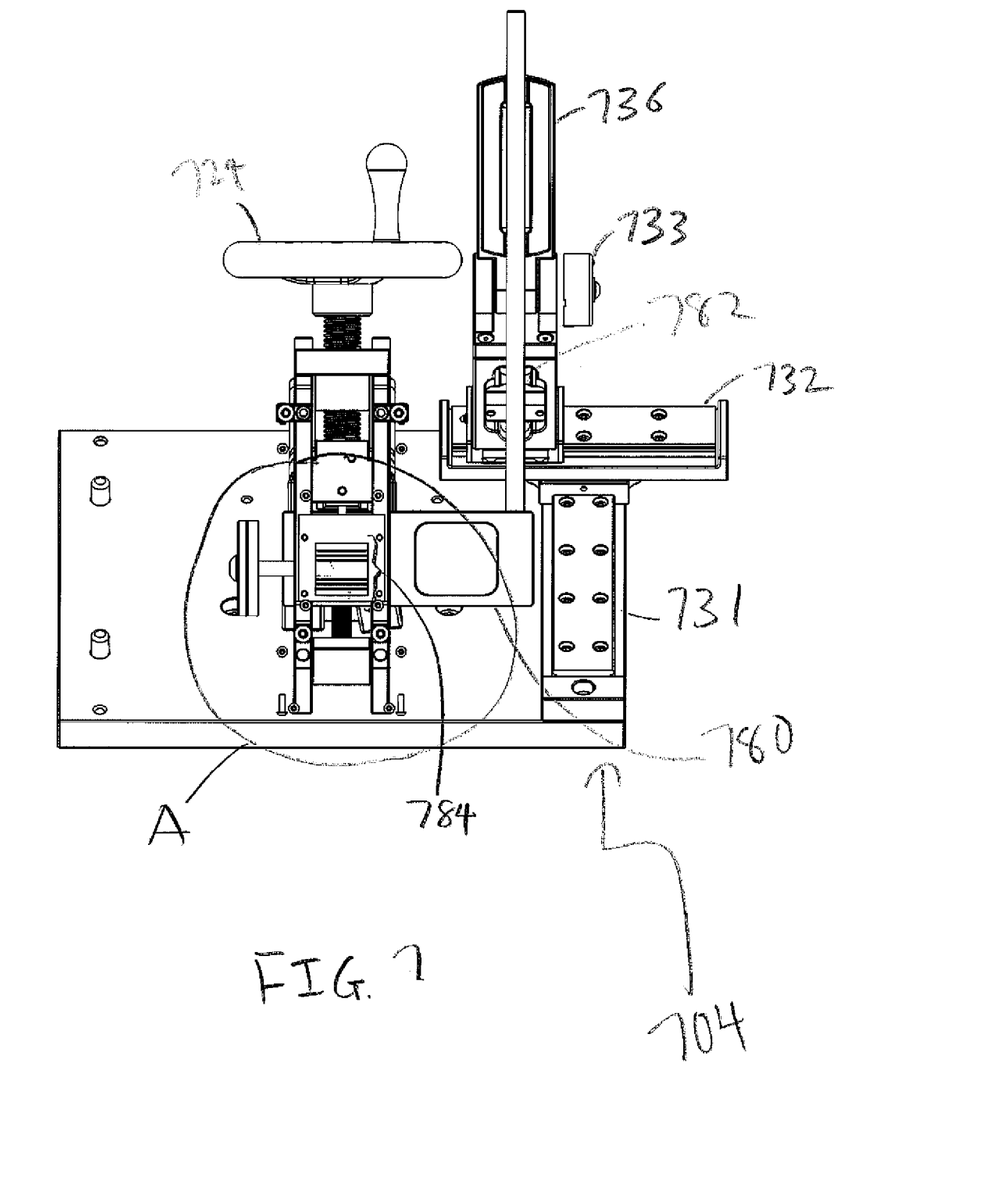
FIG. 7 of the accompanying drawings shows a frontal view of an apparatus for measuring and adjusting the loft and lie angle of a golf club having a calibration plate, FIG. 8 of the accompanying drawings shows an enlarged frontal view of an apparatus for measuring and adjusting the loft and lie angle of a golf club having a calibration plate, allowing the scorelines to be shown more clearly.

In order to fully understand the unique ability of the present invention to provide accurate measurements, a frontal view of the apparatus 704 is provided in FIG. 7 with the camera system removed, allowing the view of the camera to be shown more clearly. The figures provided in FIGS. 7 and 8 correspond with steps 652 through 658, wherein the apparatus 704 can be calibrated. In this figure shown in FIG. 7, the calibration plate 780 with a known loft and lie angle is placed into the apparatus 704. The calibration plate 780, as defined by the present invention, is generic term of art used to describe the physical plate containing a plurality of scorelines 784 that is attached to a shaft 782 at a known loft and lie angle. In this current exemplary embodiment of the present invention, the known loft angle is about 0 degrees and the known lie angle is about 90 degrees. However, it should be noted here that the exact loft and lie angle is not critical to the proper operation of the calibration of the apparatus. What is critical to the present invention is the known relationship created between the position of the scorelines and the know loft and lie angle.

Having knowledge of the relationship between the scorelines and the known loft and lie angle, the apparatus can be calibrated to ensure accurate measurements of the loft and lie angle of any subsequent golf club that is inserted into the apparatus. The current invention achieves this by using the camera to focus on the scorelines 784 of the calibration plate 780. By focusing on the scorelines 784, the camera can detect the location and angle of the scorelines based on the transition of from a dark colored region to a light colored region created by the on-axis light. This transition of light and dark regions can be used to determine the orientation of the scorelines. This information can then be combined with the angle of the loft and lie encoders to calibrate the apparatus. It should be noted that although the preferred embodiment of the present invention utilizes an on-axis light to create the boundaries of light to dark and/or dark to light transition, numerous other types of lighting may be used including infrared lighting, ambient light, or any other types of light source all without departing from the scope and content of the present invention.

Figure 8:
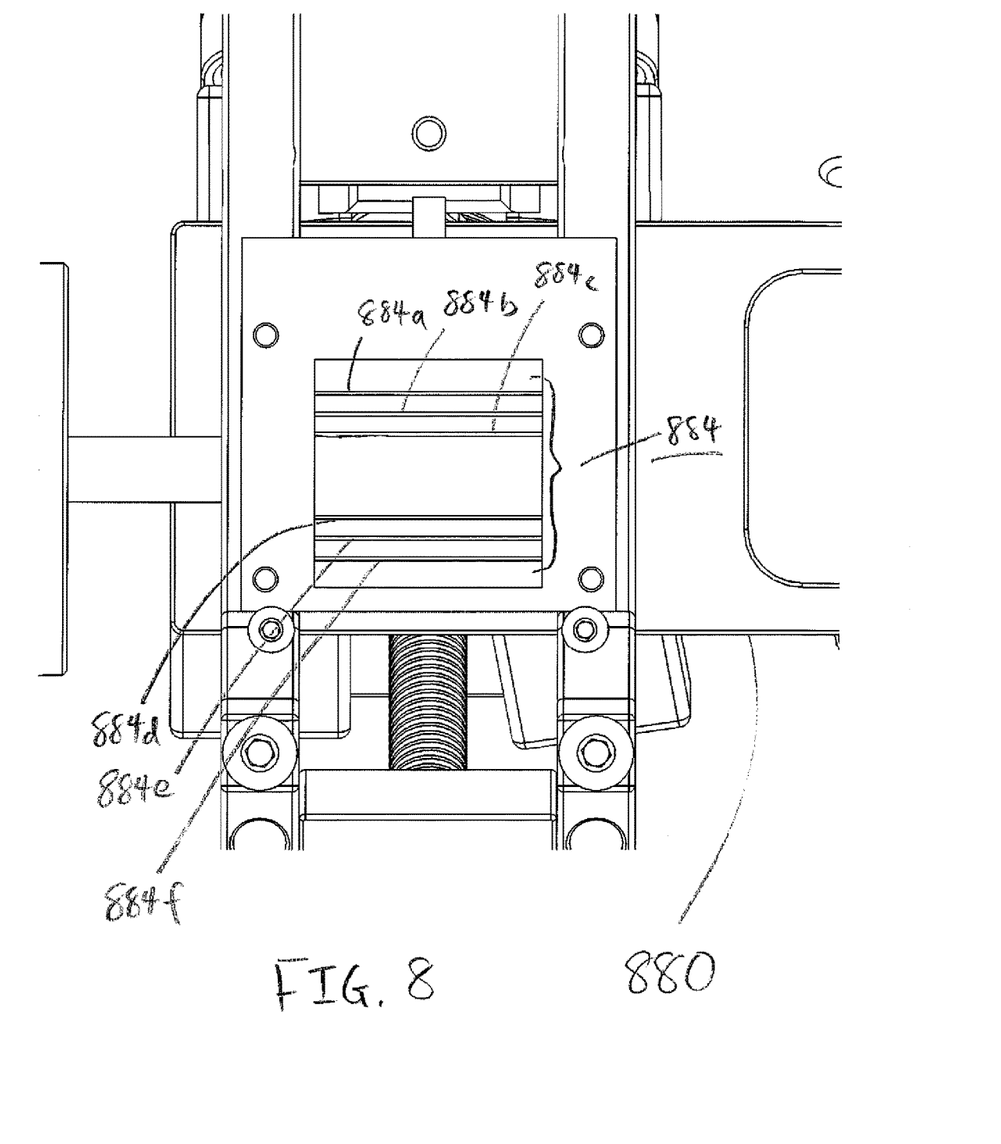

In order to provide more information on the scorelines 784, FIG. 8 is provided herein with an enlarged view of circular region A shown in FIG. 7. FIG. 8 of the accompanying drawings shows an enlarged view of the scorelines 884 portion of the calibration plate 880. This enlarged view of the scorelines 884 of the calibration plate 880 allows each individual scoreline 884*a*, 884*b*, 884*c*, 884*d*, 884*e*, and 884*f* to be shown. In this view, it can be seen that each individual scoreline has an upper portion and a lower portion, each will create a contrast of light and dark colors when subjected to on-axis light. The camera can then focus on the change between light and dark colors and draw lines that indicate the angle of the scorelines, relative to the loft and lie angles measured by the loft and lie encoders that is engaged with the shaft of the calibration plate 880. Because the calibration plate has each individual scorelines machined at a completely horizontal position, and the loft and lie angle of the shaft is known, the entire apparatus can be zeroed out at this point to complete the calibration process.

Figure 9:
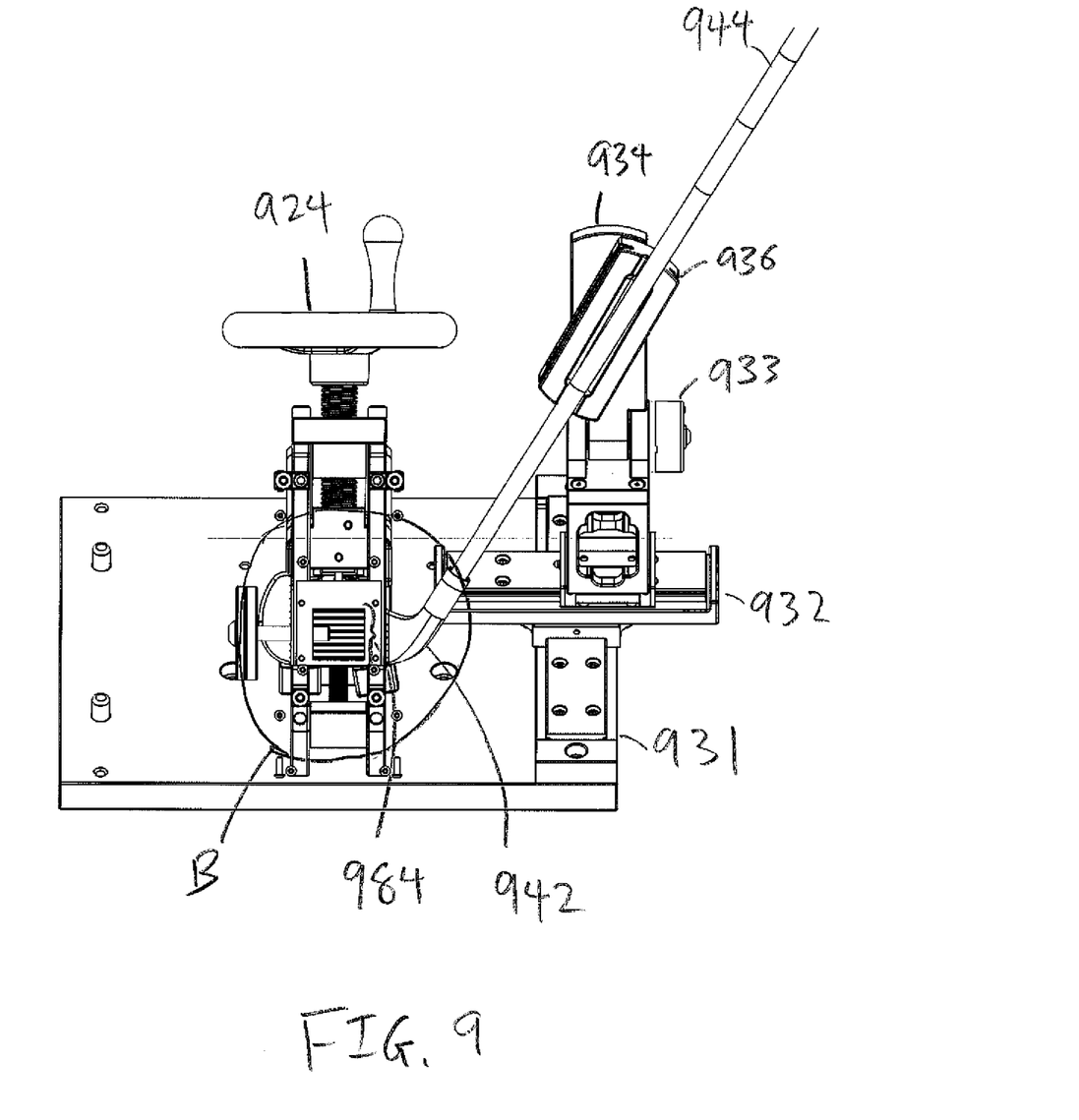
FIG. 9 of the accompanying drawings shows a frontal view of an apparatus for measuring and adjusting the loft and lie angle of a golf club having golf club installed, FIG. 10 of the accompanying drawings shows an enlarged frontal view of an apparatus for measuring and adjusting the loft and lie angle of a golf club having a golf club installed, allowing the scorelines to be shown more clearly.

Once the calibration process is complete, it is time to move onto the measurement of actual golf club heads. The actual measurement of golf club heads can be illustrated in FIG. 9 of the accompanying drawings. The steps involved with the actual measurement of the golf club head is shown as steps 660 through 674 in FIG. 6. The setup here for measurement of the loft and lie of a golf club head 942 is not much different than the steps used to calibrate the apparatus in steps 652 to 658 shown in FIG. 6. However, in this step, instead of calibrating the machine to a known loft and lie angles paired with a known scoreline 784 (shown in FIG. 7) angle; the measurement of the actual golf club head 942 determines the actual loft and lie relative to the scorelines 984. Similar to the steps above during the calibration step, the camera is programmed to focus on the change in the contrast between light and dark colors that occurs at the upper and lower portion of each scoreline 984. In order to provide more detail, an enlarged view of the scorelines 984 section is shown with circular region B, which will be shown in more detail in FIG. 10.

Figure 10:
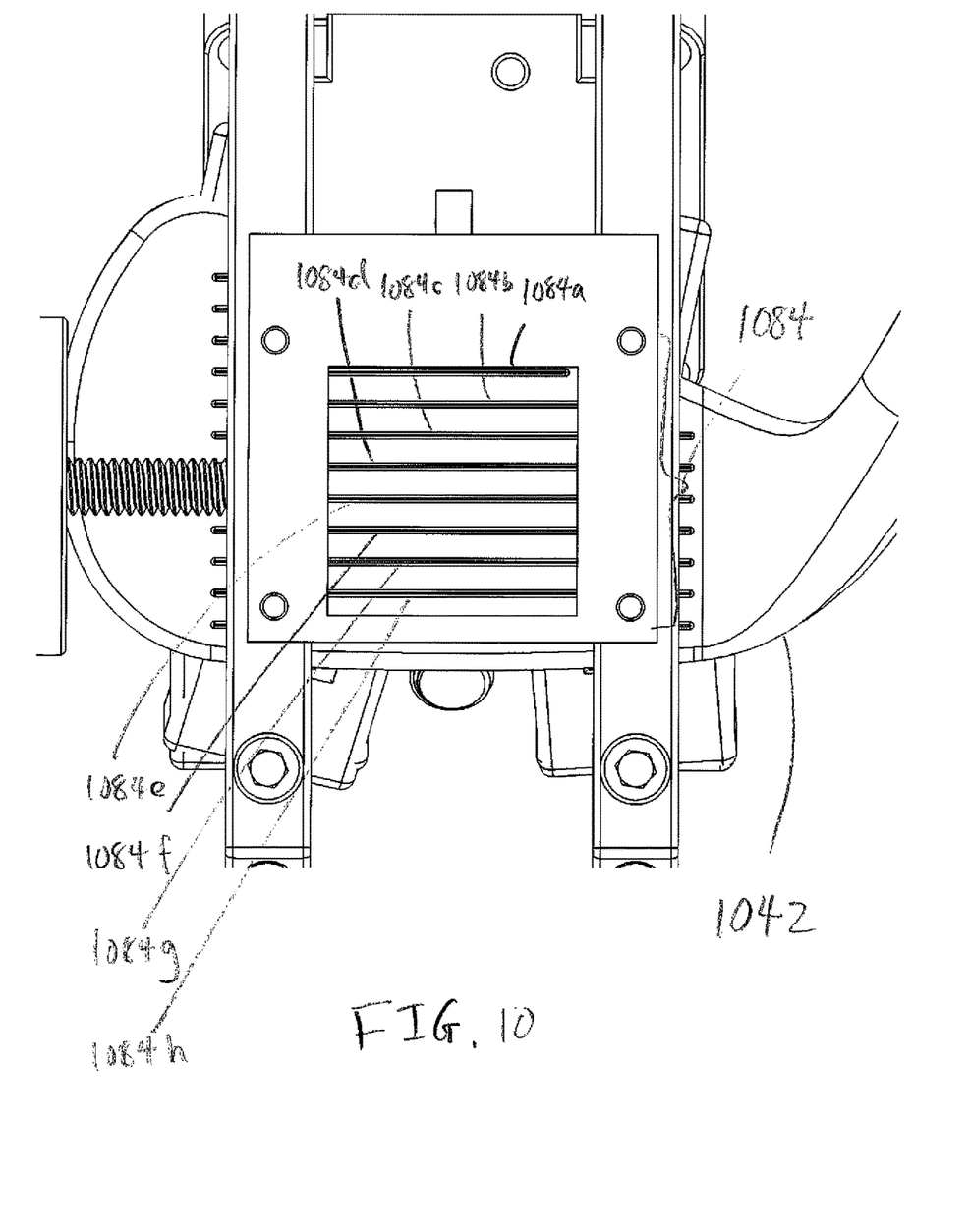

FIG. 10 of the accompanying drawings shows an enlarged view of the striking face portion of a golf club 1042 being installed in the apparatus in accordance with an exemplary embodiment of the present invention, allowing the scorelines 1084 to be shown more clearly. The plurality of scorelines 1084 that the camera sees in this embodiment may be broken down into individual scorelines 1084a, 1084b, 1084c, 1084d, 1084e, 1084f, 1084g, and 1084h. Although the number of actual scorelines visible for the camera is not a precise science, the current invention takes up to twelve contrasting change in scoreline to determine the loft and lie angle of the golf club. The current invention averages the 12 numbers to provide a more accurate result. The camera, which in this case is a Cognex® camera, is capable of capturing instantaneous measurements at a frame rate of about one frame every 70 milliseconds.

Figure 11:
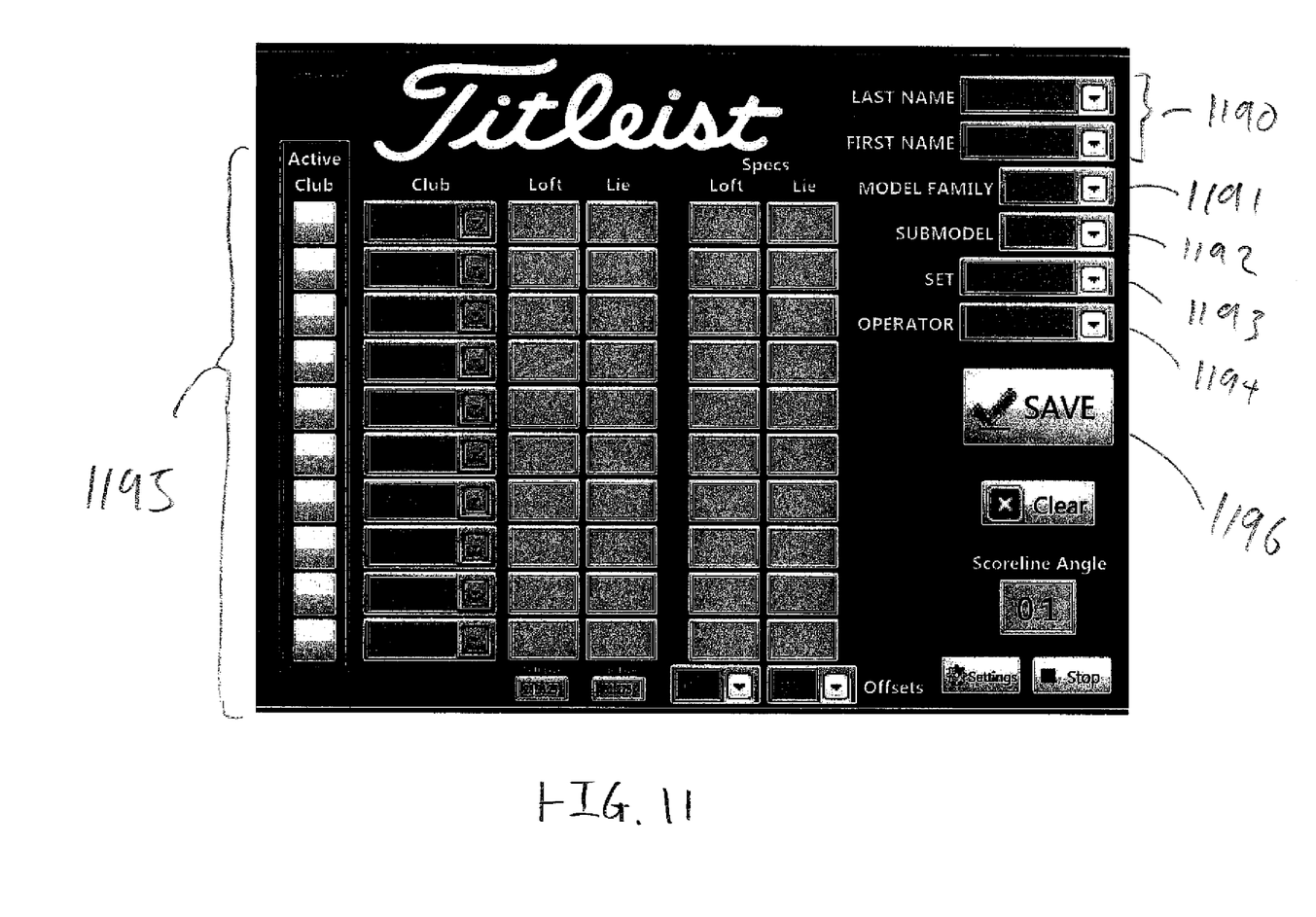
FIG. 11 of the accompanying drawings shows a screen capture of a display used to accompany the apparatus for measuring and adjusting the loft and lie angle of a golf club.

Finally, FIG. 11 of the accompanying drawings shows a screen shot of the interface that the operator see when he or she completes the measurement and adjustment of the loft and lie of a golf club head. In FIG. 11, the name of the potential owner of the golf club may be inputted under section 1190, the model family under section 1191, and the sub-model under section 1192. In section 1193 information regarding the set may be inputted, and the operators information may be stored in section 1194. Once the basic information is stored, the important information about the loft and lie of a golf club may be stored in section 1195. In this section, the actual loft and lie of the golf club may be compared to the specified loft and lie that is desired. Finally, the interface shows a save button in section 1196, allowing the information to be saved.

Other than in the operating example, or unless otherwise expressly specified, all of the numerical ranges, amounts, values and percentages such as those for amounts of materials, moment of inertias, center of gravity locations, loft, draft angles, various performance ratios, and others in the aforementioned portions of the specification may be read as if prefaced by the word "about" even though the term "about" may not expressly appear in the value, amount, or range. Accordingly, unless indicated to the contrary, the numerical parameters set forth in the above specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

It should be understood, of course, that the foregoing relates to exemplary embodiments of the present invention and that modifications may be made without departing from the spirit and scope of the invention as set forth in the following claims.

What is claimed is:

1. An apparatus for measuring and adjusting loft and lie angles of a golf club comprising:
   a clamping assembly, adapted to clamp a head portion of said golf club, wherein said clamping assembly further comprises a camera, said camera is fixedly located at a frontal portion of said clamping assembly and adapted to be focused on a plurality of scorelines located on a club head portion of said golf club, and
   a shaft measurement assembly, adapted to engage a shaft portion of said golf club head, wherein said shaft measurement assembly further comprises two or more encoders, said two or more encoders are adapted to measure a preliminary loft angle and a preliminary lie angle of said golf club,
   wherein said apparatus utilizes an orientation of said plurality of scorelines to determine a true loft angle and a true lie angle of said golf club.

2. The apparatus according to claim 1, wherein said camera measures a baseline orientation of said golf club based off said plurality of scorelines.

3. The apparatus of claim 2, wherein said true loft angle and said true lie angle is determined from adjusting said preliminary loft angle and said preliminary lie angle utilizing said orientation of said plurality of scorelines.

4. The apparatus of claim 2, wherein said orientation of said plurality of scorelines is determined based on a transition in lighting between a dark colored region and a light colored region that occurs around a boundary portion of said plurality of scorelines.

5. The apparatus of claim 4, wherein said camera focuses on said transition in on-axis light between a dark colored region and a light colored region that occurs around a boundary portion of said plurality of scorelines.

6. The apparatus of claim 5, wherein said camera is capable of capturing approximately one frame every 70 milliseconds.

7. The apparatus of claim 5, wherein said shaft measurement assembly further comprises at least one shaft alignment feature, allowing said shaft measurement assembly to contact a shaft portion of said golf club.

8. The apparatus of claim 7, wherein said shaft measurement assembly further comprises a plurality of two or more shaft grooves offset at different orientations, allowing said loft angle and said lie angle to be measured more accurately.

9. An apparatus for measuring and adjusting loft and lie angles of a golf club comprising:

a clamping assembly, adapted to clamp a head portion of said golf club, wherein said clamping assembly further comprises a camera, said camera is adapted to be focused on a plurality of scorelines located on a club head portion of said golf club, and a shaft measurement assembly, adapted to engage a shaft portion of said golf club head, wherein said shaft measurement assembly further comprises at least one shaft alignment feature and two or more encoders, said two or more encoders are adapted to measure a preliminary loft angle and a preliminary lie angle of said golf club, wherein said apparatus determines a true loft angle and a true lie angle of said golf club by adjusting said preliminary loft angle and said preliminary lie angle using said orientation of said plurality of scorelines.

10. The apparatus of claim 9, wherein said orientation of said plurality of scorelines is determined based on a transition in lighting between a dark colored region and a light colored region that occurs around a boundary portion of said plurality of scorelines.

11. The apparatus of claim 10, wherein said camera is capable of capturing approximately one frame every 70 milliseconds.

12. The apparatus of claim 10, wherein said apparatus further comprises an input device and a display, allowing the results an operator to input variables and view outputs.

13. A method of measuring and adjusting the loft and lie angle of a golf club head comprising:

inserting a golf club head into an apparatus, aligning a shaft portion of said golf club head with at least one shaft alignment feature portion on said apparatus, and measuring a loft angle and a lie angle of said golf club,
wherein said step of measuring said loft angle and said lie angle of said golf club utilizes a camera and a plurality of two or more encoders, said camera adjusts a preliminary loft angle and a preliminary lie angle measurement of said plurality of two or more encoders to yield a true loft angle and a true lie angle, and wherein said adjustment of preliminary lie angle and preliminary loft angle via said camera further comprises focusing said camera on a plurality of scorelines on a striking face portion of said golf club.

14. The method of claim 13, wherein said step of measuring a loft angle and a lie angle of said golf club further comprises, providing instantaneous loft and lie angle feedback to an operator when a measurement of said true loft angle and said true lie angle.

15. The method of claim 13, wherein said step of adjusting preliminary lie angle and preliminary loft angle of said golf club via said camera further comprises obtaining a baseline orientation based on an angle of said plurality of scorelines on said striking face portion of said golf club.

16. The method of claim 15, wherein said step of obtaining a baseline orientation further comprises having said camera focus on a transition in lighting between a dark colored region and a light colored region that occurs around a boundary portion of said plurality of scorelines to determine an orientation of said plurality of said scorelines.

* * * * *